UNITED STATES PATENT OFFICE.

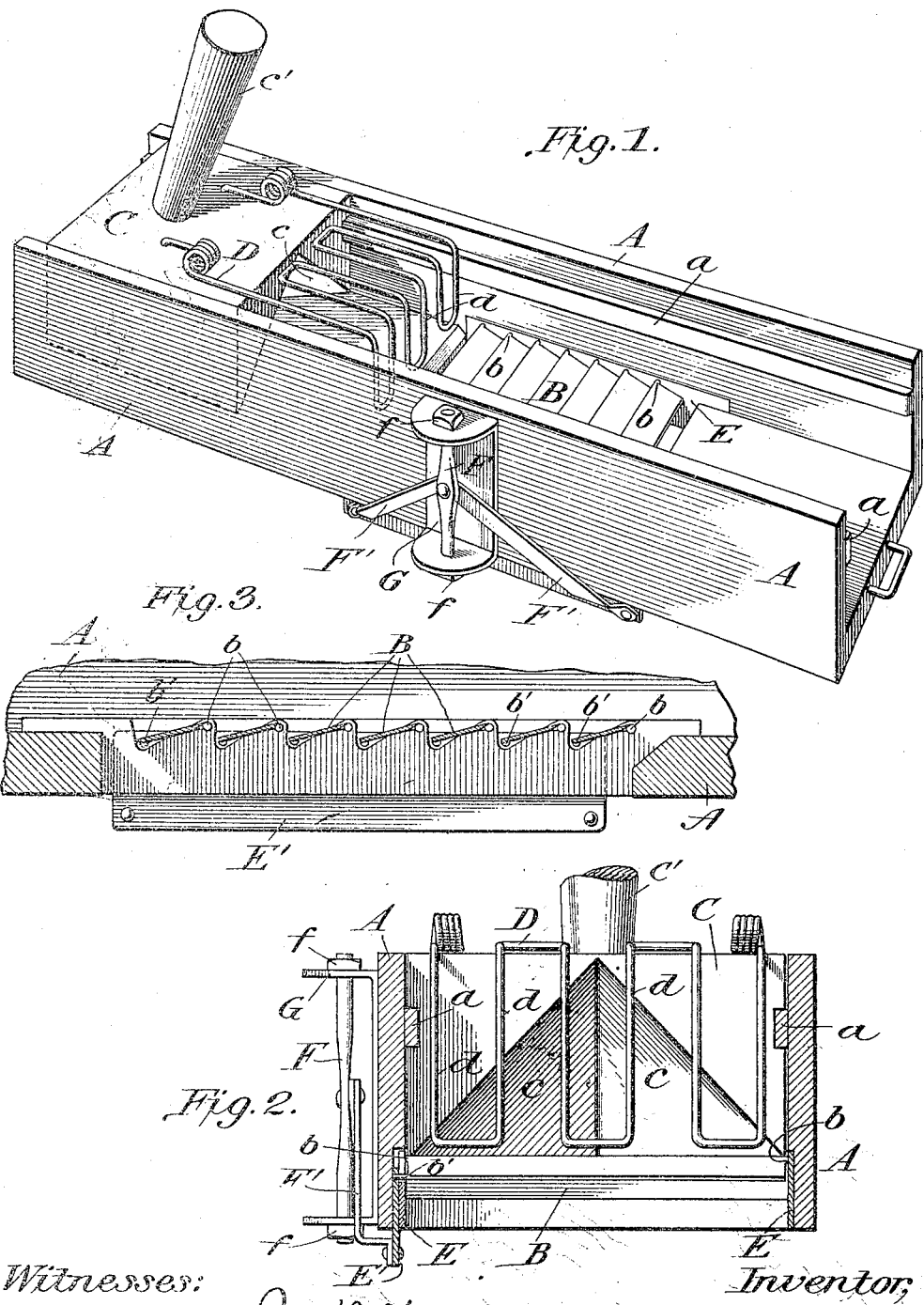

RICHARD C. EZEKIEL, OF CARBON HILL, ALABAMA.

VEGETABLE-SLICER.

No. 872,919. Specification of Letters Patent. Patented Dec. 3, 1907.

Application filed September 23, 1905. Serial No. 279,370.

*To all whom it may concern:*

Be it known that I, RICHARD C. EZEKIEL, a citizen of the United States, and a resident of Carbon Hill, in the county of Walker and State of Alabama, have invented certain new and useful Improvements in Vegetable-Slicers, of which the following is a specification.

My invention is an improvement in that class of vegetable slicers in which the vegetable is reciprocated over the cutter or cutters fixed in a suitable base or support.

My invention is embodied in the construction, arrangement, and combination of parts hereinafter described, and illustrated in the accompanying drawing, in which Figure 1 is a perspective view of my improved vegetable slicer. Fig. 2 is a transverse vertical section. Fig. 3 is a longitudinal section of the central portion of the apparatus.

A indicates a trough or guideway, B a series of transverse cutters arranged in an opening in the bottom of the guide, and C is a block provided with means for holding the vegetable and adapted to slide in the guideway to carry the vegetable back and forth over the cutters. For guiding the device C and holding it down in its sliding movement the inner parallel and vertical sides of the guideway are provided with ribs $a$ and the part C with corresponding side grooves. The part or block C is provided in its inner end with a recess $c$ adapted to receive the vegetable in whole or in part. It will be seen that the said recess opens widely at the bottom and is inclined at the top so that when pushed forward toward and over the cutters, the vegetable will be crowded or pushed downward and thus held in the required contact with the cutters. The block C is provided with an inclined handle $c'$ and also with a spring presser and vegetable holder D, which is formed of spring wire bent into a series of loops $d$ and the front ends of the same curved downward, the ends of the wire being formed with coils and secured to the top of the block C. The free end of this device D may be raised and lowered to introduce the vegetable behind the same, and it is obvious that the horizontal portion of the spring loops $d$ will bear upon the vegetable, if it be of sufficient size, and thus assist in holding the same pressed downward upon the cutters.

The principal feature of my invention is the arrangement of the cutters for adjustment to cause them to cut slices of varying thickness. The cutters are provided at their ends with pivots $b$ which are nearly in line with their front or cutting edges, and the same are journaled in metal plates E attached to the inner side of the guideway at the bottom of the same. At one end, the cutters are also provided with another pivot $b'$ which is separated from the pivot $b$ by nearly the width of the blades or cutters proper. The pivots $b'$ are journaled in the plate E' which is arranged parallel and behind the adjacent plate E and is adapted for adjustment higher or lower, which adjustment, as is obvious, will give a greater or less transverse inclination to the cutters. In other words, if the plate E' be adjusted as high as practicable, the cutters will be placed nearly horizontal and will therefore take a very thin slice; while on the other hand, if the plate E' be adjusted as low as practicable, the inclination of the cutters will correspond and they will take a very thick slice.

The means for adjusting the plate E' for the purpose of regulating the transverse inclination of the cutters comprises a vertical screw-threaded rod F, nuts $f$ applied thereto, a bracket G secured to the outer side of the guideway A, and bars or links F' which are pivoted to the central portion of the rod F, and at their lower ends to the ends of the vertically adjustable plate E'. By adjusting nuts $f$ up or down, it is obvious the screw-threaded rod F will be raised or lowered correspondingly and that the arms F' will carry the plate E' up or down to the same extent, whereby the inclination of the cutters will be regulated accordingly. This adjustment of the angle of the cutter may be easily and quickly made.

What I claim is:

In a vegetable slicer, the combination, with a guideway having an opening in the bottom, of cutters arranged in series and pivoted at their ends, a means for adjusting them at different inclinations crosswise of the guideway, said means comprising a vertically adjustable plate arranged longitudinally of said guideway and having a pivotal connection with the rear edge of the cutters, a screw-threaded rod and means for holding the same in vertical position, nuts applied to said rod for adjusting it higher or lower, and bars which pivotally connect the rod with the vertically adjustable plate as shown and described.

RICHARD C. EZEKIEL.

Attest:
J. D. WILLIAMS,
J. GOODMAN.